(12) United States Patent
Takai et al.

(10) Patent No.: US 7,708,341 B2
(45) Date of Patent: May 4, 2010

(54) VEHICLE SEATS

(75) Inventors: Nobuhito Takai, Nissin (JP); Hitoshi Yanase, Toyota (JP); Koji Ito, Yatomi (JP); Setsu Takuma, Gamagori (JP); Hiromi Kondo, Aichi-ken (JP); Yoshiyuki Amamiya, Kariya (JP)

(73) Assignees: Toyota Boshoku Kabushiki Kaisha, Aichi-Ken (JP); Aisin Seiki Kabushiki Kaisha, Aichi-Ken (JP)

( * ) Notice: Subject to any disclaimer, the term of this patent is extended or adjusted under 35 U.S.C. 154(b) by 163 days.

(21) Appl. No.: 12/019,182

(22) Filed: Jan. 24, 2008

(65) Prior Publication Data
US 2008/0191524 A1    Aug. 14, 2008

(30) Foreign Application Priority Data
Jan. 29, 2007    (JP)    ............................. 2007-017816

(51) Int. Cl.
*A47C 31/00* (2006.01)
(52) U.S. Cl. .................................................. 297/217.3
(58) Field of Classification Search ............. 297/217.3; 200/85 A; 180/273
See application file for complete search history.

(56) References Cited

U.S. PATENT DOCUMENTS

| | | | | |
|---|---|---|---|---|
| 3,704,352 | A | * | 11/1972 | Fontaine .................... 200/85 R |
| 3,735,380 | A | * | 5/1973 | Wolf et al. ................. 200/85 A |
| 5,896,090 | A | | 4/1999 | Okada et al. |
| 5,965,856 | A | * | 10/1999 | Okada et al. ............... 200/85 A |
| 6,448,789 | B1 | | 9/2002 | Kraetzl |
| 7,100,980 | B2 | * | 9/2006 | Young et al. .............. 297/217.2 |
| 7,162,344 | B2 | * | 1/2007 | Kojima et al. ................. 701/45 |
| 7,283,898 | B2 | * | 10/2007 | Kamiya ........................ 701/34 |
| 7,365,549 | B2 | | 4/2008 | Karges et al. |
| 2006/0091708 | A1 | | 5/2006 | Zenba et al. |
| 2006/0162983 | A1 | | 7/2006 | Hofmann |

FOREIGN PATENT DOCUMENTS

| | | |
|---|---|---|
| DE | 19722163 | 12/1997 |
| DE | 19956545 | 4/2001 |
| DE | 102004002479 | 8/2005 |
| DE | 102005056882 | 7/2006 |
| DE | 102005011742 | 9/2006 |
| JP | 10-329597 | 12/1998 |
| JP | 2000-037256 | 2/2000 |

(Continued)

OTHER PUBLICATIONS

English language Abstract of JP 2000-037256.

(Continued)

*Primary Examiner*—Milton Nelson, Jr.
(74) *Attorney, Agent, or Firm*—Greenblum & Bernstein, P.L.C.

(57) ABSTRACT

A vehicle seat has a seat cushion having a cushion pad deformable to be flexed when a seating load of an occupant is applied. A seating sensor is disposed within the seat cushion for detecting a seating position of the occupant. The seating sensor is configured as a push-in switch and can detect the seating position of the occupant when the seating sensor is pressed by the cushion pad. A fragile region is interleaved between the seating sensor and the cushion pad at a pressure receiving region where the pressing force is applied to the seating sensor. The fragile region has rigidity lower than the cushion pad.

9 Claims, 6 Drawing Sheets

FOREIGN PATENT DOCUMENTS

| | | |
|---|---|---|
| JP | 2005-112335 | 4/2005 |
| JP | 2006-143045 | 6/2006 |
| WO | 2006/095025 | 9/2006 |

OTHER PUBLICATIONS

English language Abstract of JP 2005-112335.
English language Abstract of JP 2006-143045.
English language Abstract of JP 10-329597.
U.S. Appl. No. 12/018,930 to Takai et al., which was filed on Jan. 24, 2008.
English language Abstract of DE 19956545, Apr. 26, 2001.
English language Abstract of DE 19722163, Dec. 4, 1997.
English language Abstract of DE 102004002479, Aug. 11, 2005.

* cited by examiner

United States Patent US 7,708,341 B2

VEHICLE SEATS

This application claims priority to Japanese patent application serial number 2007-017816, the contents of which are incorporated herein by reference.

BACKGROUND OF THE INVENTION

1. Field of the Invention

The present invention relates to vehicle seats, and in particular to vehicle seats that have a seat cushion having a seating region.

2. Description of the Related Art

Known seats of industrial vehicles, such as forklifts, have seating sensors for detecting a seated position of an operator in order to allow the operator to operate machines and instruments on the condition that the operator is seated on the seat. Japanese Laid-Open Patent Publication No. 10-329597 discloses a technique of providing a seating sensor disposed within a seat cushion for detecting a seated position of an occupant. More specifically, the seating sensor has a sheet-like configuration and is interleaved between a surface layer and a cushion pad of the seat cushion. According to this technique, when an occupant is seated on the seat cushion, a pressing force is applied to the seat sensor by the seating load, so that the seated position can be detected.

However, with the above technique, the resilient force of the cushion pad or a pre-tensioning force of the surface layer may be easily applied to the seating sensor. Therefore, if the resilient force of the cushion pad or the pre-tensioning force of the surface layer is strong, it is likely that the seating sensor may receive the pressing force due to the resilient force of the pre-tensioning force, causing false detection of the seating sensor.

Therefore, there has been a need for vehicle seats that do not produce such a pressing force that may result in a false detection of a seating sensor disposed at a vehicle seat.

SUMMARY OF THE INVENTION

One aspect according to the present invention includes a vehicle seat including a seat cushion. The seat cushion has a cushion pad deformable to be flexed when a seating load of an occupant is applied. A seating sensor is disposed within the seat cushion and can detect a seating position of the occupant. The seating sensor is configured as a push-in switch and can detect the seating position of the occupant when the seating sensor is pressed by the cushion pad. A fragile region is interleaved between the seating sensor and the cushion pad at a pressure receiving region where the pressing force is applied to the seating sensor. The fragile region has rigidity lower than the cushion pad.

With this arrangement, the pressing force that may be accidentally applied to the seating sensor the due to the resilient force of the cushion pad can be absorbed by the fragile region. Therefore, in the state before the operator is seated on the vehicle seat, the resilient force of the cushion pad may not be applied to the seating sensor. On the other hand, when the occupant is seated on the vehicle seat, the seating sensor can receive the pressing force due to the resilient force of the cushion pad that is deformed by the seating load of the occupant.

In one embodiment, the fragile region is a depressed space formed in the cushion pad, so that the pressure receiving region of the cushion pad and the seating sensor are spaced from each other by the depressed space. Therefore, the pressing force that may be accidentally applied to the seating sensor due to the resilient force of the cushion pad can be completely absorbed by the depressed space.

In another embodiment, the seating sensor is a sheet-like membrane switch including a plurality of push-in type switch portions arranged in a row. The cushion pad has a plurality of the pressure receiving regions corresponding to the switch portions. The seat cushion has a recess formed on a backside thereof. The membrane switch is disposed within the recess of the seat cushion, so that the membrane switch is positioned relative to the seat cushion with respect to a horizontal direction. A plurality of the depressed spaces are formed in series with the recess of the seat cushion, so that each of the switch portions of the membrane switch is spaced from the corresponding pressure receiving region.

With this arrangement, the seating sensor configured as a membrane switch can be assembled with the cushion pad, while it is appropriately received within the recess of the cushion pad and is positioned relative to the recess.

The vehicle seat may be applied to an industrial vehicle, such as a forklift. The industrial vehicle may have a safety device that inhibits the operation of the machines or instruments of the industrial vehicle if the seated position of the operator is not detected. For this purpose, the vehicle sensor can adequately detect the seated position of the industrial vehicle.

Another aspect of the present invention includes a vehicle seat having a seat cushion having a resiliently deformable cushion pad, a seating sensor mounted within the cushion pad and operable to detect a seating position of an occupant when the cushion pad is deformed by a seating load of the occupant, and an accidental operation preventing device constructed to prevent the seating sensor from being accidentally operated when the occupant is not seated on the vehicle seat. The accidental operation preventing device may include a space defined in the seat cushion in a direction of application of the seating load and in a position opposing to the seating sensor.

DETAILED DESCRIPTION OF THE INVENTION

Each of the additional features and teachings disclosed above and below may be utilized separately or in conjunction with other features and teachings to provide improved vehicle seats and methods of manufacturing such vehicle seats. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
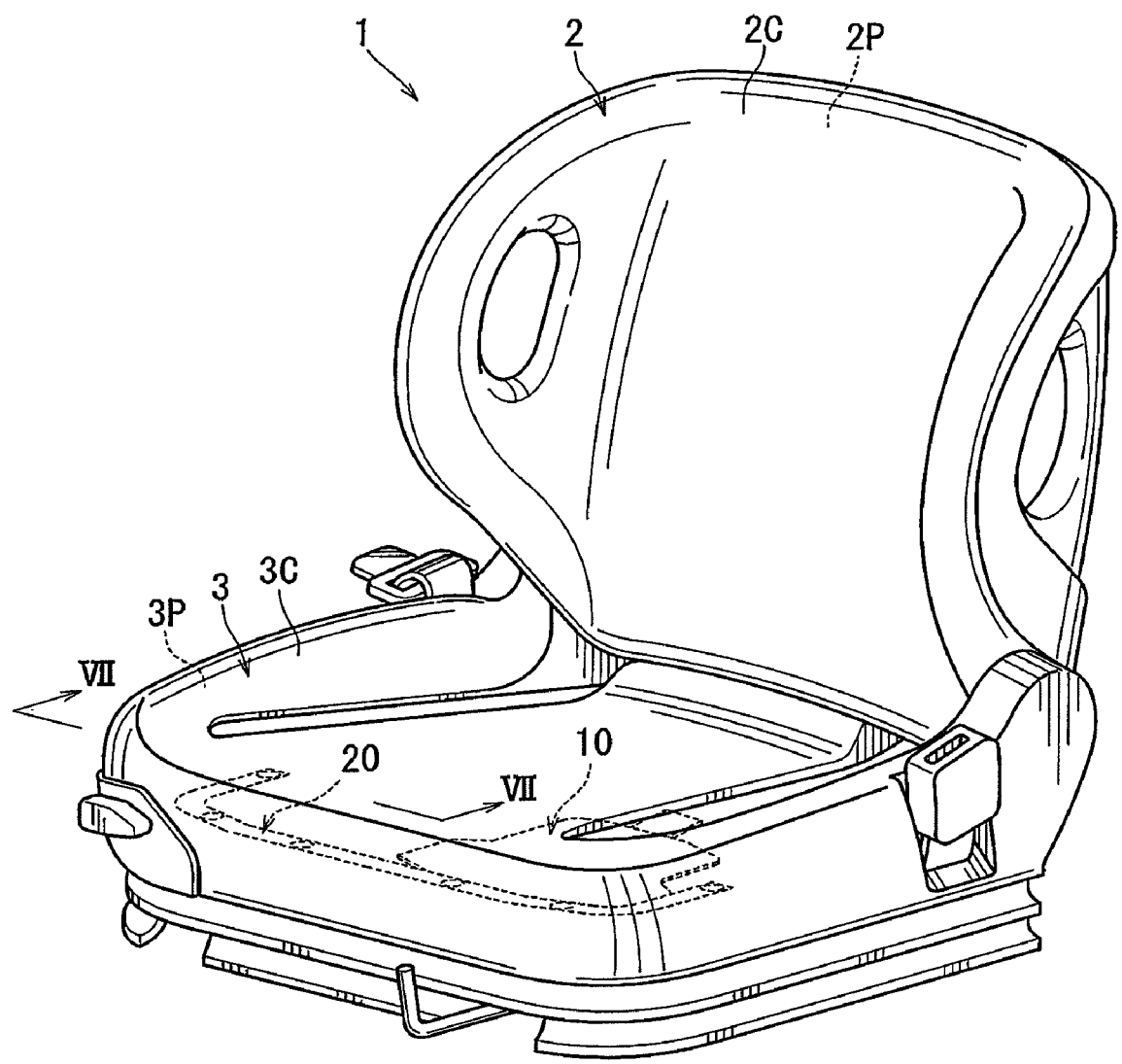
FIG. 1 is a schematic perspective view of a vehicle seat according to an embodiment of the present invention.

The construction of a vehicle seat 1 according to an embodiment of the present invention will now be described with reference to FIGS. 1 to 7. FIG. 1 schematically shows the construction of the vehicle seat 1 in a perspective view. The vehicle seat 1 is designed as a cockpit seat that is installed on an industrial vehicle, such as a forklift. The industrial vehicle, on which the vehicle seat 1 is installed, may have a safety device (not shown) that can inhibit operations of machines or instruments for moving the vehicle or for manipulating a lift fork or the like.

A seated position of an occupant on the vehicle seat 1 can be detected by a first seating sensor 10 and a second seating sensor 20 that are disposed within a space defined by an outer contour of a seat cushion 3 that constitutes a seating portion. The first seating sensor 10 and the second seating sensor 20 are configured such that a detecting condition of the seated position can be maintained as long as at least one of the first and second seating sensors 10 and 20 detects the seated position of the occupant.

The components of the vehicle seat 1 will now be described in detail. The vehicle seat 1 generally includes a seatback 2 and the seat cushion 3. The seatback 2 is constituted by an iron framework (not shown) and a cushion pad 2P assembled with the framework. The cushion pad 2P may be made of urethane foam. The seat cushion 3 is constituted by a resin framework (not shown) and a cushion pad 3P assembled with the framework. The cushion pad 3P also may be made of urethane foam. The cushion pad 2P is molded integrally with a surface layer 2C that is made of polyvinyl chloride and is positioned on the side of the seating surface of the cushion pad 2P. Similarly, the cushion pad 3P is molded integrally with a surface layer 3C that is made of polyvinyl chloride and is positioned on the side of the seating surface of the cushion pad 3P.

Figure 2:
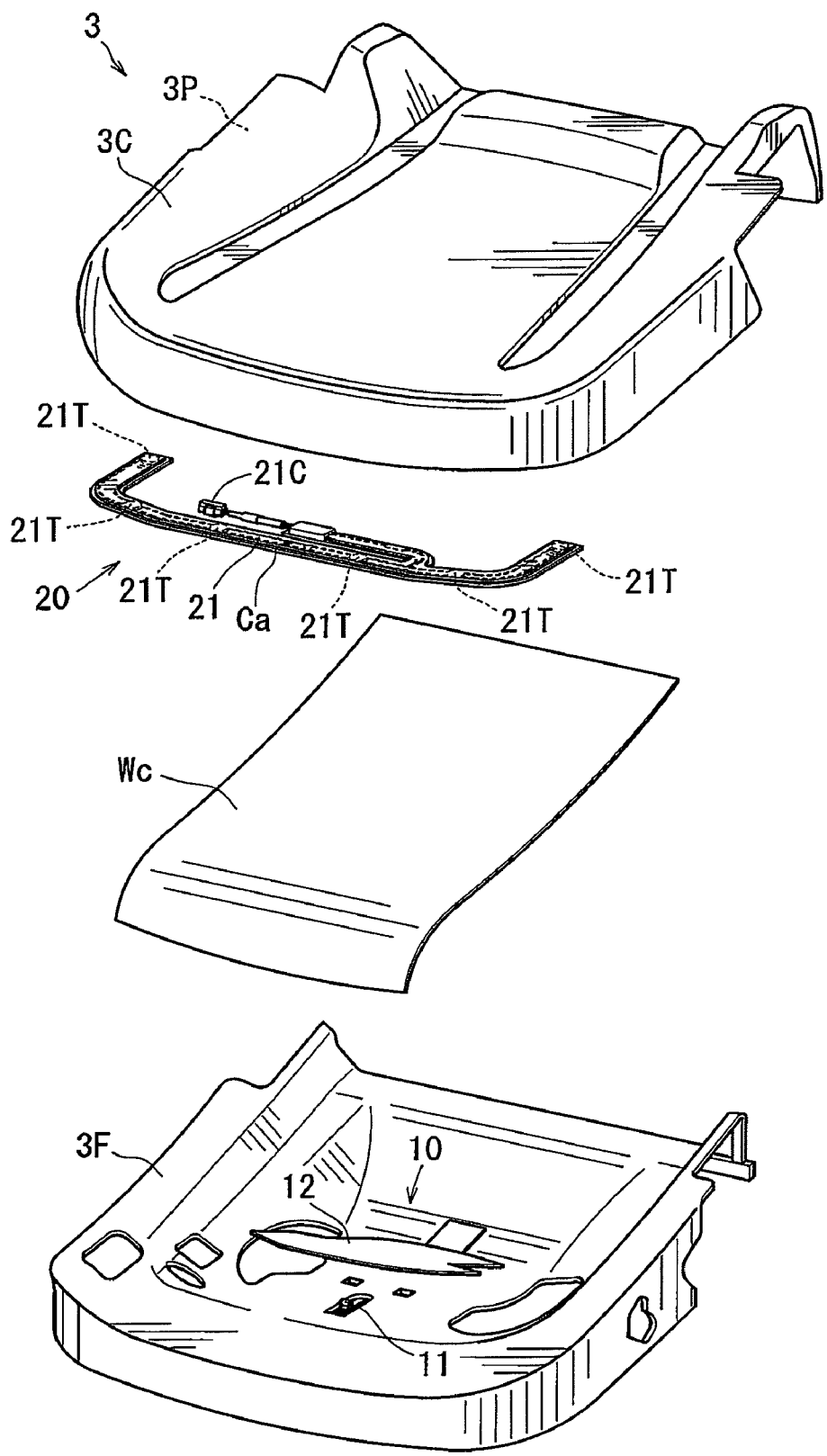
FIG. 2 is an exploded perspective view of a seat cushion of the vehicle seat.

FIG. 2 shows the components of the seat cushion 3 in an exploded perspective view. As shown in FIG. 2, a push-button type limit switch 11 is attached to a resin cushion frame 3F constituting the framework of the seat cushion 3. The limit switch 11 serves as a detection switch of the first seating sensor 10.

The limit switch 11 is inserted from the lower side of the cushion frame 3F and is assembled with the cushion frame 3F such that the limit switch 11 extends partly upward from the upper surface of the cushion frame 3F. A pressure-receiving plate 12 made of a thin iron plate is attached to the upper surface of the cushion frame 3F. The pressure-receiving plate 12 is positioned centrally of a seating region of the seat cushion 3, i.e., at a central position of the seating region of the seat cushion 3 where the body weight of an operator is applied when the operator is seated on the vehicle seat 1. In FIG. 2, for easy understanding of the position of the limit switch 11, the pressure-receiving plate 12 is illustrated as if it is bent upward. However, actually, when no load is applied to the pressure-receiving plate 12, the pressure-receiving plate 12 maintains a flat plate-like configuration to extend over the limit switch 11 not to contact therewith as shown in FIG. 3.

Figure 3:
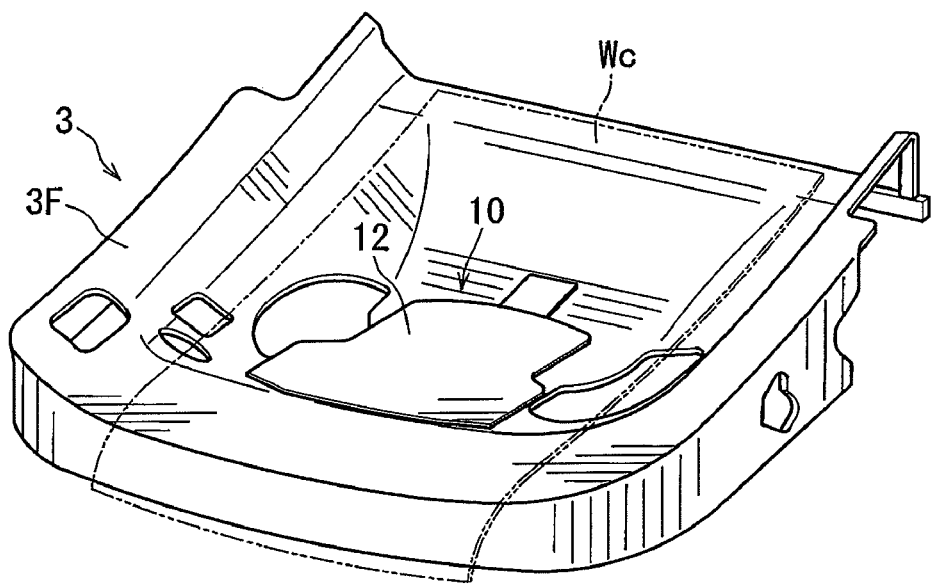
FIG. 3 is a structural view showing the assembled state of the seat cushion.

The pressure-receiving plate 12 has a flexibility and can be flexed downward as viewed in FIG. 3 as the pressure-receiving plate 12 is pressed by the cushion pad 3P due to the body weight of the operator when the operator is seated on the vehicle seat 1.

The configuration of the support surface of the upper portion of the cushion frame 3F, which supports the pressure-receiving plate 12 from the lower side, is curved to be concaved, so that a predetermined gap is produced between the pressure-receiving plate 12 and the upper portion of the cushion frame 3F when no load is applied to the pressure-receiving plate 12. When the operator is seated on the seat cushion 3, the pressure-receiving plate 12 is flexed downward toward the upper portion of the cushion frame 3F due to the load applied to the pressure-receiving plate 12. Therefore, the limit switch 11 is pushed downward, so that electrical contacts of the limit switch 11 contact with each other to allow conduction therebetween for outputting a detection signal indicating that the operator is seated on the vehicle seat 1.

As the operator leaves the vehicle seat 1 or the operator raises his or her body from the vehicle seat 1, the pressure-receiving plate 12 resiliently restores its original configuration that was possessed before flexing. Hence, the pushed state of the limit switch 11 is released, so that the detecting condition of the seated position is released. The limit switch 11 may be constructed the same as limit switches that are generally known in the art.

Returning to FIG. 2, an elongated flat membrane switch 21 constituting a detection switch of the second seating sensor 20 is disposed between the cushion pad 3P and the cushion frame 3F.

Figure 5:
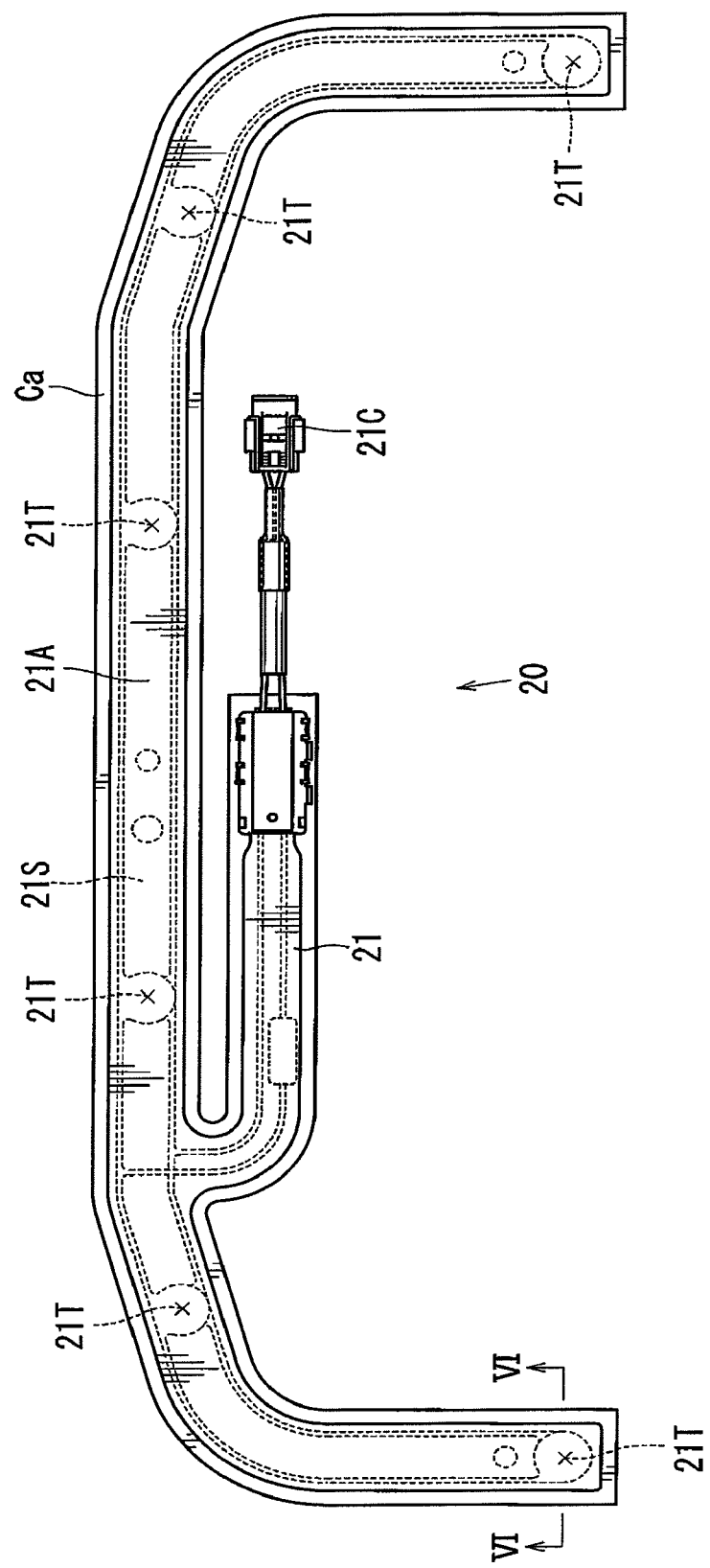
FIG. 5 is a plan view of a membrane switch of the vehicle seat.
Figure 6:
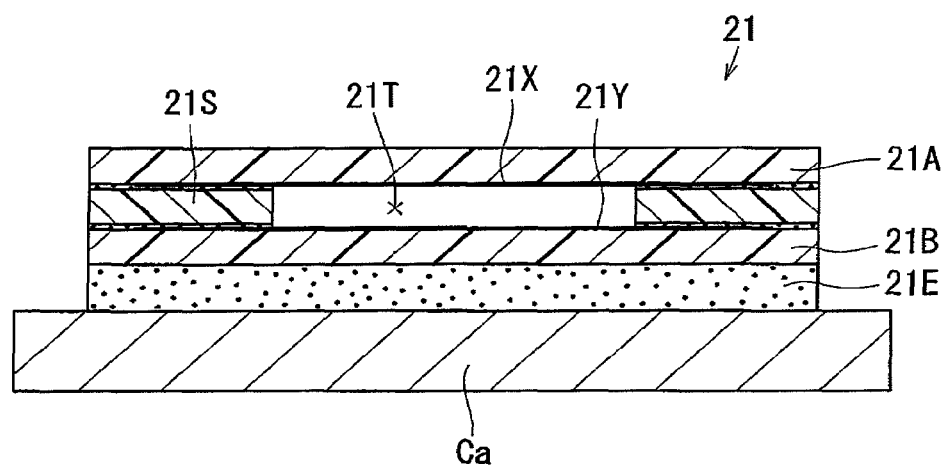
FIG. 6 is a cross sectional view taken along line VI-VI in FIG. 5.

As shown in FIGS. 5 and 6, the membrane switch 21 has a plurality of layered thin films and extends in a manner like a U-shape to follow the configuration of a peripheral portion of the seat cushion 3. In FIG. 6, the thickness of each layer of the membrane switch 21 is shown in an exaggerated form to be greater than the actual thickness in order to enable the layered structure of the membrane switch 21 to be easily understood.

Returning again to FIG. 2, the membrane switch 21 has push type switch portions each defining a cylindrical space 21T that has contacts (not shown) disposed therein. The switch portions are located at six positions along the length of the membrane switch 21 (see FIG. 5) so as to be positioned along a front part and opposite side parts with respect to the widthwise direction of the peripheral portion of the seat cushion 3. When the operator is seated to apply a downward pressing force to either the regions having the cylindrical spaces 21T of the membrane switch 21, the cylindrical space (s) 21T that has received the downward pressing force is collapsed, so that the contacts of the collapsed cylindrical space(s) contact with each other to allow conduction therebetween for outputting a detection signal indicating that the operator is seated.

Returning to FIG. 1, the front part and the opposite side parts with respect to the widthwise direction of the peripheral portion of the seat cushion 3 are raised upward relative to the central portion of the seating region. Therefore, when the operator, who is seated on the vehicle seat 1, leans his or her body forward from the vehicle seat 1 or inclines his or her body laterally, the body weight may be applied to the peripheral portion of the seat cushion 3 as the position of the gravity center of the body moves. Hence, the membrane switch 21 disposed along the seat cushion 3 can detect the seating position of the operator when the seating posture of the operator has been changed.

The construction of the membrane switch 21 will now be described in detail. As shown in FIG. 6, the membrane switch 21 has an upper electrode sheet 21A, a spacer 21S and a lower electrode sheet 21B. Each of the upper electrode sheet 21A and the lower electrode sheet 21B is made of a thin polyester film, such as a PET film and a PEN film. The lower electrode sheet 21B is stacked below and attached to the upper electrode sheet 21A with the intervention of the spacer 21S between the upper electrode sheet 21A and the lower electrode sheet 21B. An upper pattern 21X is formed on an inner face of the upper electrode sheet 21A and a lower pattern 21Y is formed on an entire inner face of the lower electrode sheet 21B opposing to the inner face of the upper electrode sheet 21A. The upper and lower patterns 21X and 21Y constitute the contacts of the membrane switch 21 and are made of a conductive material such as silver and carbon applied by a printing technique. The spacer 21S is made of insulating material and is disposed along all over the surfaces of the upper and lower electrode sheets 21A and 21B. The cylindrical spaces 21T described above are formed in the spacer 21S at six positions along the length of the spacer 21S. In this way, the upper pattern 21X and the lower pattern 21Y are spaced to be isolated from each other by the spacer 21S.

As the operator is seated on the vehicle seat 1 to apply the downwardly pressing force to any of the regions having the spaces 21T of the membrane switch 21, the upper electrode sheet 21A resiliently flexes downward, so that the upper electrode sheet 21A contacts the lower electrode sheet 21B. Hence, the upper pattern 21X and the lower pattern 21Y constituting the contacts contact with each other to allow conduction therebetween for outputting a detection signal indicating that the operator is seated.

As the operator leaves the vehicle seat 1 or the operator raises his or her body from the vehicle seat 1, the upper electrode sheet 21A resiliently restores its original configuration that was possessed before flexing. Therefore, the upper pattern 21X moves away from the lower pattern 21Y, so that the detection signal indicating that the operator is seated may not be outputted.

Figure 4:
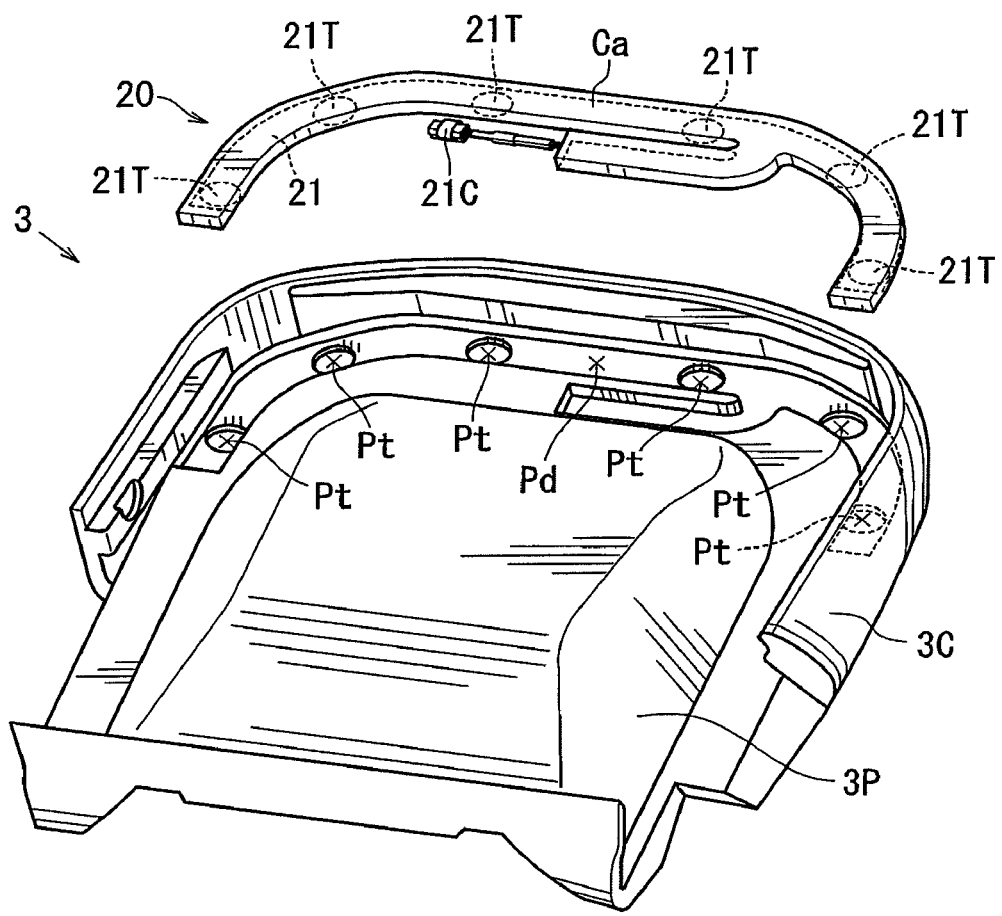
FIG. 4 is a perspective view of a cushion pad of the vehicle seat as viewed from the rear side of the cushion pad.

As shown in FIG. 4, the membrane switch 21 is assembled with the cushion pad 3P by positioning the membrane switch 21 within a recess Pd formed on the back side of the cushion pad 3P. As shown in FIG. 6, the lower electrode sheet 21B of the membrane switch 21 is attached to a carpet Ca by means of an adhesive layer 21E, so that the membrane switch 21 is integrated with the carpet Ca. The thickness of the carpet Ca is greater than the thickness of the membrane switch 21 and the size (i.e., the surface area) of the carpet Ca is larger than the size of the membrane switch 21. Therefore, the thickness of the membrane switch 21 is increased by the thickness of the carpet Ca, and the bending rigidity of the membrane switch 21 is appropriately increased by the carpet Ca. As a result, the facility of assembling the membrane switch 21 within the recess Pd and the portability of the membrane switch 21 can be improved.

Thus, the total thickness of the membrane switch 21 can be increased by the attachment of the carpet Ca, so that the holding performance of the membrane switch 21 against the recess Pd can be improved, and the potential movement of the membrane switch 21 relative to the recess Pd can be prevented or minimized. In this embodiment, the width of the carpet Ca is set to be greater than the width of the membrane switch 21, while the width of the recess Pd is set to be substantially equal to the width of the carpet Ca. Therefore, by positioning the membrane switch 21 in a way that the carpet Ca is fitted into the recess Pd, the membrane switch 21 can be assembled with the cushion pad 3P, while it is appropriately received within the recess Pd and is positioned relative to the recess pd with respect to the horizontal direction.

The carpet Ca is formed by two layers of needle-punched carpets, so that one of the opposite surfaces of the carpet Ca on the side of the membrane switch 21 is flat and smooth and the other of the opposite surfaces (on the side of the cushion frame 3F) is rough. In this embodiment, a shape holding property (bending rigidity) of the carpet Ca is higher than that of the membrane switch 21. However, the carpet Ca still has a such a flexibility that allows the carpet Ca to be freely bent and deformed. Therefore, the membrane switch 21 having the carpet Ca attached thereto can be prevented from flapping during the time when it is carried around, while it can be assembled into the recess Pd by arbitrary suitably bending it for installation into the recess Pd.

Figure 8:
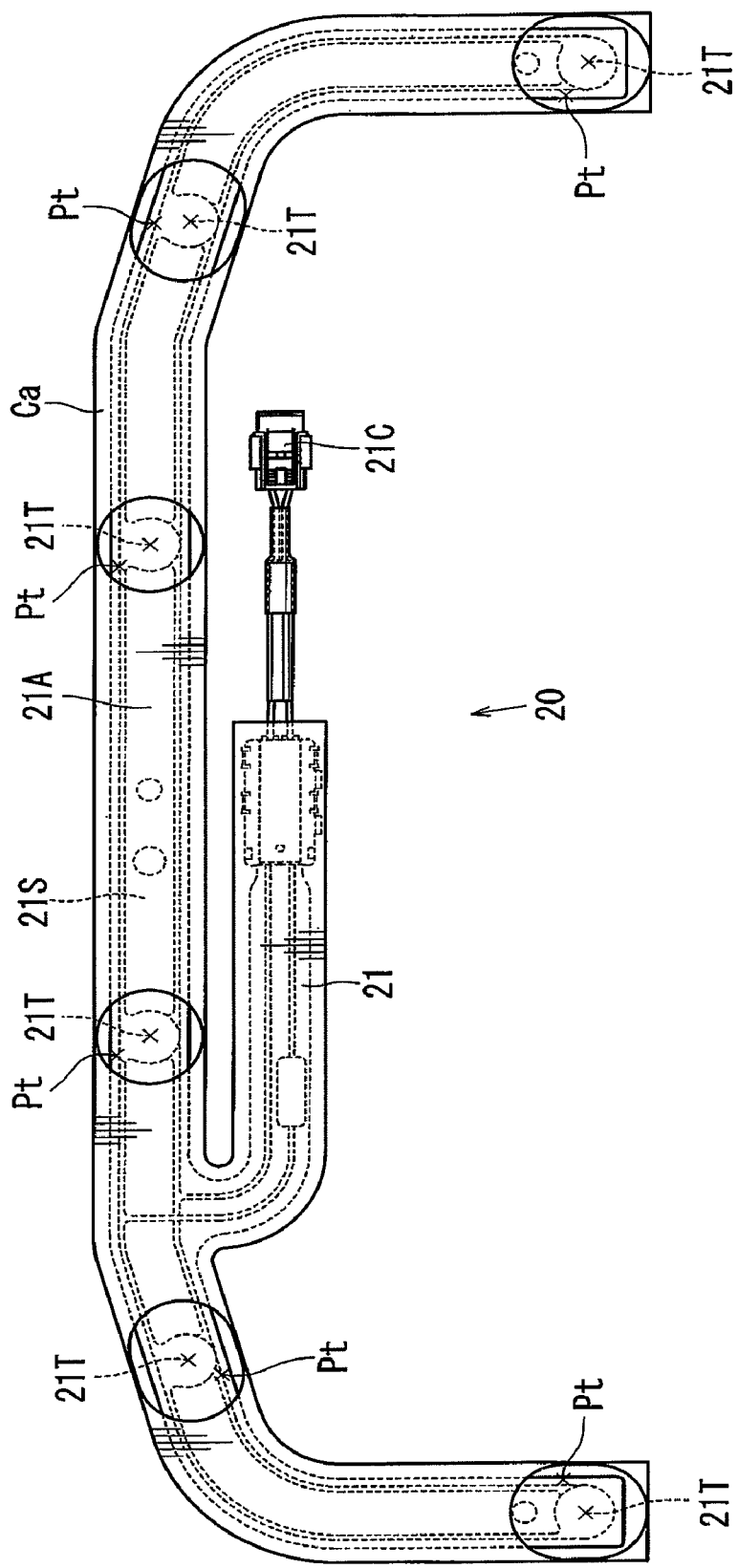
FIG. 8 is a schematic view showing the positional relation between one of depressions of the cushion pad and the membrane switch.

Further, as shown in FIG. 4, at six portions of the recess Pd where the spaces 21T are positioned to oppose thereto, depressions Pt are formed to be depressed further from the bottom of the recess Pd. Two of the depressions Pt positioned on the side of the center of the front side portion of the seat cushion 3 are depressed with a circular configuration. The remaining four depressions Pt positioned on the side of opposite lateral side portions are depressed with an oblong configuration. More specifically, as shown in FIG. 8, the four depressions Pt on the side of the lateral side portions are elongated to be oblong along curved configurations of opposite lateral side portions of the recess Pd, which are curved rearward to follow the configuration of the membrane switch 21. Therefore, even in the event that the movement of the membrane switch 21 has been caused at curved portions on opposite sides of the recess Pd, where a clearance is prone to be produced, the spaces 21T can still be positioned within the regions of the corresponding depressions Pt. The two depressions Pt positioned on the side of the center of the front side portion of the seat cushion 3 are not necessary to have an oblong configuration but may have a circular configuration as noted above, because these two depressions Pt are positioned where a straight portion of the membrane switch 21 extends, and it is not likely that the movement of the membrane switch 21 is caused at this position.

Figure 7:
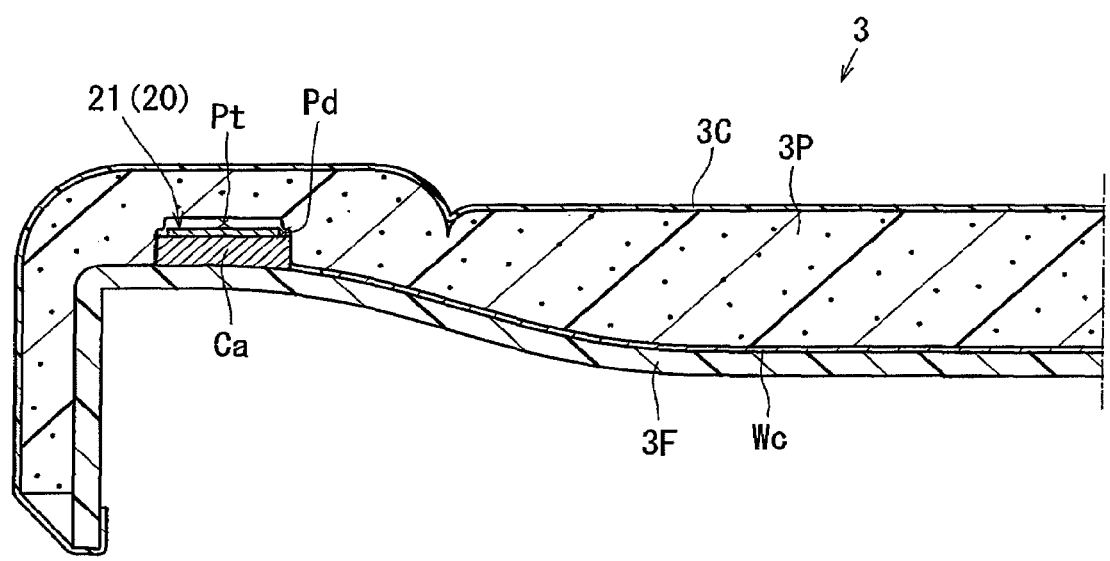
FIG. 7 is a cross sectional view taken along line VII-VII in FIG. 1.

Therefore, in the state where the membrane switch 21 is positioned within the recess Pd as shown in FIG. 7, the membrane switch 21 is spaced from the cushion pad 3P and does not contact the cushion pad 3P at six positions where the depressions Pt (only one depression Pt is shown in FIG. 7) are formed. Hence, at these six positions, spaces are defined between the membrane switch 21 and bottoms of the depressions Pt and can absorb a resilient force of the cushion pad 3P. As a result, it is possible to prevent the membrane switch 21 from false detection of the seated position when in the state before the operator is seated on the vehicle seat 1. In addition, by changing the depth or the size of the depressions Pt, it is possible to easily adjust the sensitivity of the second seating sensor 20 (i.e., a pressing load required for the contact between the upper electrode sheet 21A and the lower electrode sheet 21B of the membrane switch 21).

As shown in FIG. 2, a connector 21C is connected to the membrane switch 21 and has wiring terminals for the upper pattern 21X and the lower pattern 21Y. A harness (not shown) can be connected to the connector 21C, so that the output signal of the membrane switch 21 can be supplied to a control circuit located on the side of a vehicle body. The harness also can be connected to a connector (not shown) of the limit switch 11, so that the output signal of the limit switch 11 can also be supplied to the control circuit. Therefore, the detection of the seated position of the operator can be made based on the output signal from at least one of the first seating sensor 10 and the second seating sensor 20.

As shown in FIG. 2, a thin non-woven fabric Wc is positioned between the cushion pad 3P and the cushion frame 3F. As shown in FIG. 7, the non-woven fabric Wc is interleaved between the cushion pad 3P and the cushion frame 3F in order to prevent the cushion pad 3P from directly contacting with the cushion frame 3F. Therefore, for example, when the vehicle is used for operation within a refrigerated room, it is possible to prevent the cushion pad 3P from being adhered to the cushion frame 3F due to freezing. Hence, it is possible to inhibit the situation where the limit switch 11 has been accidentally continually pressed by the cushion pad 3P.

The method of use of the vehicle seat 1 of the above embodiment will now be described. Referring to FIG. 1, when the operator is not seated on the vehicle seat 1, both of the first seating sensor 10 and the second seating sensor 20 do not detect the seating position of the operator. Therefore, the operations of machines or instruments for moving the vehicle or for manipulating a lift fork or the like can be inhibited.

When the operator seats on the vehicle seat 1, the body weight of the operator is applied to the central portion of the seating region of the seat cushion 3, so that the seating position is detected by the first seating sensor 10. When the operator, who is seated on the vehicle seat 1, leans his or her body forward from the vehicle seat 1 or inclines his or her body laterally, the body weight is applied to the peripheral portion of the seating region of the seat cushion 3 as the position of the gravity center of the body moves. Therefore, even if the first seating sensor 10 could not detect the seated position of the operator due to the raising of his or her hip, the second seating sensor 20 can detect the seating position of the operator. As a result, the detection of the seating position is still possible.

As described above, according to the vehicle seat 1 of the present invention, the first seating sensor 10 and the second seating sensor 20 are positioned at the central portion and the peripheral portion of the seating region of the seat cushion 3, respectively. Therefore, even if the operator, who is seated on the vehicle seat 1, has changed his or her seating posture, for example, due to relaxing the posture, it is possible to still detect the seated position of the operator.

In addition, the membrane switch 21 constituting the second seating sensor 20 has portions positioned on opposite sides with respect to the widthwise direction of the peripheral portion of the seat cushion 3, it is possible to detect the seated position even if the operator leans his or her body laterally from the vehicle seat 1 or inclines his or her body laterally while he or she is seated on the vehicle seat 1.

Further, because the membrane switch 21 has a portion disposed at the front part of the peripheral portion of the seat cushion 3, it is possible to detect the seated position even if the operator leans his or her body forwardly from the vehicle seat 1 or inclines his or her body forwardly while he or she is seated on the vehicle seat 1.

Furthermore, by applying the vehicle seat 1 to the industrial vehicle, such as a forklift, it is possible to detect the seated position even if the operator has raised his hip or inclined his body laterally during the operation of the machines or instruments of the industrial vehicle. Therefore, it is possible to control such that the operation of the machines or instruments can still be made even in this situation. It is also possible to control such that (1) the operation of the machines or instruments is interrupted when the operator has left the vehicle seat 1 during the operation of the machines or instruments and (2) the operation of the machines or instruments is permitted again when the operator has returned to be seated on the vehicle seat 1.

Furthermore, because the depressions Pt are formed to provide spaces between the second seating sensor 20 and the cushion pad 3P at regions where the pressing force may be applied for operating the second seating sensor 20, it is possible to prevent the second seating sensor 20 from receiving a pressing force that may lead the accidental operation of the second seating sensor 20.

Furthermore, because the membrane switch 21 can be assembled with the cushion pad 3P, while it is appropriately received within the recess Pd of the cushion pad 3P and is positioned relative to the recess Pd, the second seating sensor 20 can reliably operate to detect the seating position. In other words, switching between detection and non-detection of the seating position can be made in a stable fashion.

Although the present invention has been described according to the above embodiment, the present invention can be carried out in other various embodiments.

For example, although the above embodiment has been described in connection with the vehicle seat used for industrial vehicles, such as forklifts, the present invention also may be applied to vehicle seats that are used for automobiles that are not of industrial use.

Although the first seating sensor is embodied as a limit switch and the second seating sensor is embodied as a membrane switch in the above embodiment, these sensors can be embodied as any types of push switches. For example, the first seating sensor may be embodied as a membrane switch and the second seating sensor may be embodied as a limit switch.

Although the spaces or clearances are formed by the depressions for absorbing the resilient deformation of the cushion pad, which may accidentally push the membrane switch, it is possible to interleave elements that has rigidity lower than the cushion pad (fragile elements) between the membrane switch and the cushion pad at regions where the pressing force is applied for operating the membrane switch.

Although the peripheral portion of the seating region of the cushion pad is raised upward relative to the central portion of the seating region, the cushion pad may be flat throughout the seating region.

Although the surface layer is integrated with the cushion pad, a separate surface layer may be tensioned so as to be attached to the surface of the cushion pad. Although the tensioning force of the surface layer may be applied to the cushion pad in this design, no pressing force that may cause accidental operation will be applied to the membrane switch.

What is claimed is:

1. A vehicle seat comprising:
    a seat cushion having a cushion pad deformable to be flexed when a seating load of an occupant is applied; and
    a seating sensor disposed within the seat cushion and constructed to detect a seating position of the occupant;
    wherein the seating sensor is configured as a push-in switch and can detect the seating position of the occupant when the seating sensor is pressed by the cushion pad; and
    a fragile region interleaved between the seating sensor and the cushion pad at a pressure receiving region where a pressing force is applied to the seating sensor,
    wherein the fragile region has a rigidity lower than the cushion pad,
    wherein the seating sensor comprises a first electrode sheet positioned on a side of the cushion pad and a second electrode sheet positioned on a side opposite to the first electrode sheet, the first and second electrode sheets defining a space therebetween; and wherein the space is positioned on a side opposite to the fragile region with respect to the first electrode sheet.

2. The vehicle seat as in claim 1, wherein the fragile region comprises a depressed space formed in the cushion pad, so that the pressure receiving region of the cushion pad and the seating sensor are spaced from each other by the depressed space.

3. The vehicle seat as in claim 2, wherein:

the first and second electrode sheets define a plurality of spaces therebetween, so that portions of the first and second electrode sheets opposed to each other via the spaces are configured as a plurality of push-in type switch portions arranged in a row;

the pressure receiving region of the cushion pad comprises a plurality of pressure receiving regions corresponding to the switch portions;

the seat cushion has a recess formed on a backside thereof;

the seating sensor is disposed within the recess of the seat cushion, so that the seating sensor is positioned relative to the seat cushion with respect to a horizontal direction;

the depressed space comprises a plurality of depressed spaces formed in series with a bottom of the recess of the seat cushion, so that each of the switch portions of the seating sensor is spaced from the corresponding pressure receiving region.

4. The vehicle seat as in claim 1, wherein the vehicle seat is applied to an industrial vehicle.

5. The vehicle seat as in claim 4, wherein the industrial vehicle comprises a forklift.

6. The vehicle seat as in claim 1, wherein the seating sensor is disposed within a peripheral portion of the seat cushion.

7. The vehicle seat as in claim 6, further comprising a second seating sensor disposed within a central portion of the seat cushion.

8. A vehicle seat comprising:

a seat cushion having a resiliently deformable cushion pad;

a seating sensor mounted within the cushion pad and operable to detect a seating position of an occupant when the cushion pad is deformed by a seating load of the occupant; and an accidental operation preventing device constructed to prevent the seating sensor from being accidentally operated when the occupant is not seated on the vehicle seat, wherein:

the cushion pad defines therein a sensor receiving space;

the sensor receiving space has a first wall surface and a second wall surface opposed to each other and arranged in a direction of application of the seating load, the first wall surface being positioned on a side opposite to the direction of application of the seating load and the second wall surface being positioned on a side of the direction of application of the seating load;

the seating sensor comprises a first flexible member opposed to the first wall surface of the sensor receiving space and a second flexible member opposed to the second wall surface; and the accidental operation preventing device is positioned between the first wall surface of the sensor receiving space and the first flexible member of the seating sensor.

9. The vehicle seat as in claim 8, wherein the accidental operation preventing device comprises a space defined in the first wall surface of the sensor receiving space of the seat cushion.

* * * * *